(12) United States Patent
Peng et al.

(10) Patent No.: US 7,492,586 B2
(45) Date of Patent: Feb. 17, 2009

(54) FIXING APPARATUS FOR HARD DISK DRIVE

(75) Inventors: Wen-Tang Peng, Taipei Hsien (TW); Xin-Hu Gong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/953,863

(22) Filed: Dec. 11, 2007

(65) Prior Publication Data
US 2008/0278856 A1 Nov. 13, 2008

(30) Foreign Application Priority Data
May 11, 2007 (CN) .......................... 2007 1 0200602

(51) Int. Cl.
*G06F 1/16* (2006.01)
(52) U.S. Cl. .................. 361/685; 360/264.2; 312/223.2; 248/694
(58) Field of Classification Search .............. 360/236.6, 360/254.2, 264.2, 97.01; 349/65; 175/62; 307/154; 248/694; 312/223.2–223.3; 361/679–687, 361/724–727
See application file for complete search history.

(56) References Cited

U.S. PATENT DOCUMENTS 6,185,103 B1 * 2/2001 Yamada ...................... 361/727
2007/0230105 A1 * 10/2007 Su ............................. 361/685

* cited by examiner

*Primary Examiner*—Hung V Duong
(74) *Attorney, Agent, or Firm*—Frank R. Niranjan

(57) ABSTRACT

An exemplary fixing apparatus is for mounting a hard disk drive having a plurality of holes in sidewalls thereof. The fixing apparatus includes a first fixing plate, a bracket, and a transverse bar. The bracket includes a second fixing plate, and a bezel assembly attached to a first end of the second fixing plate. Each of the first fixing plate and the second fixing plate include a plurality of fixing members formed at inside walls thereof to engage in the holes of the disk drive. The first fixing plate is pivotally attached to a free end of the bezel assembly. One end of the transverse bar is pivotally attached to a second end of the second fixing plate opposite to the first end and the other end of the transverse bar detachably engages with the first fixing plate.

12 Claims, 4 Drawing Sheets

FIXING APPARATUS FOR HARD DISK DRIVE

BACKGROUND

1. Field of the Invention

The present invention relates to fixing apparatuses, and particularly to a fixing apparatus for hard disk drives (HDD).

2. Description of Related Art

The conventional approach now being adopted to mount an HDD in a computer chassis generally involves placing the HDD in a holding area of a drive bracket; screwing a plurality of screws through side walls of the drive bracket into two sides of the HDD to fasten the HDD on the drive bracket; and mounting the HDD and the bracket in a computer chassis or a mobile HDD rack. For proper balanced installation of the HDD, multiple screws should be fastened at the same time, making installing and removing operations of the HDD tedious.

What is desired, therefore, is a fixing apparatus which allows convenient installation and removal of an HDD.

SUMMARY

An exemplary fixing apparatus is for mounting an HDD having a plurality of holes in sidewalls thereof. The fixing apparatus includes a first fixing plate, a bracket, and a transverse bar. The bracket includes a second fixing plate, and a bezel assembly attached to a first end of the second fixing plate. Each of the first fixing plate and the second fixing plate includes a plurality of fixing members formed at inside walls thereof to engage in the holes of the HDD. The first fixing plate is pivotally attached to a free end of the bezel assembly. One end of the transverse bar is pivotally attached to a second end of the second fixing plate opposite to the first end and the other end of the transverse bar detachably engages with the first fixing plate.

Other advantages and novel features will become more apparent from the following detailed description when taken in conjunction with the accompanying drawings, in which:

DETAILED DESCRIPTION OF THE EMBODIMENT

Figure 1:
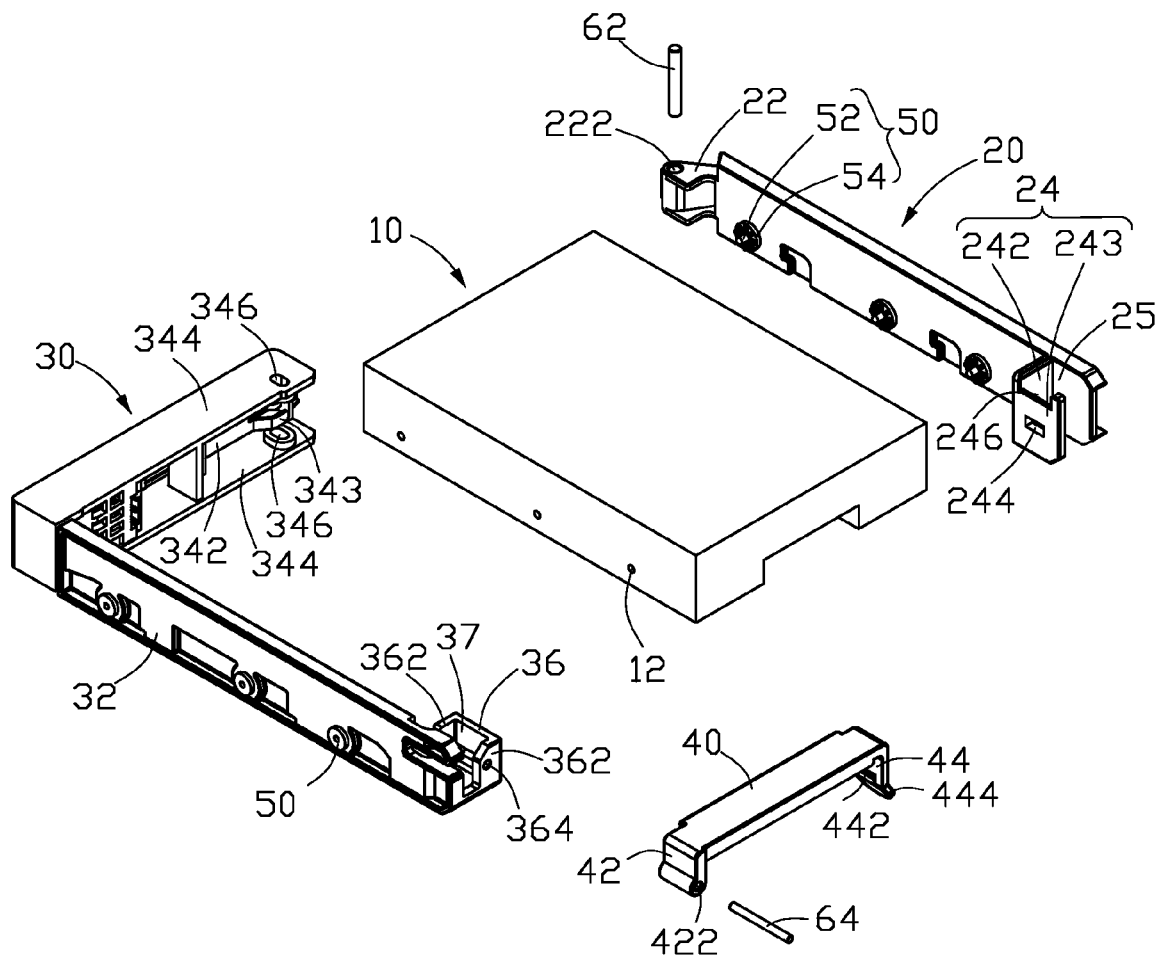
FIGS. 1 and 2 are exploded, isometric views of a fixing apparatus of an embodiment of the present invention together with an HDD, but viewed in different aspects.
Figure 2:
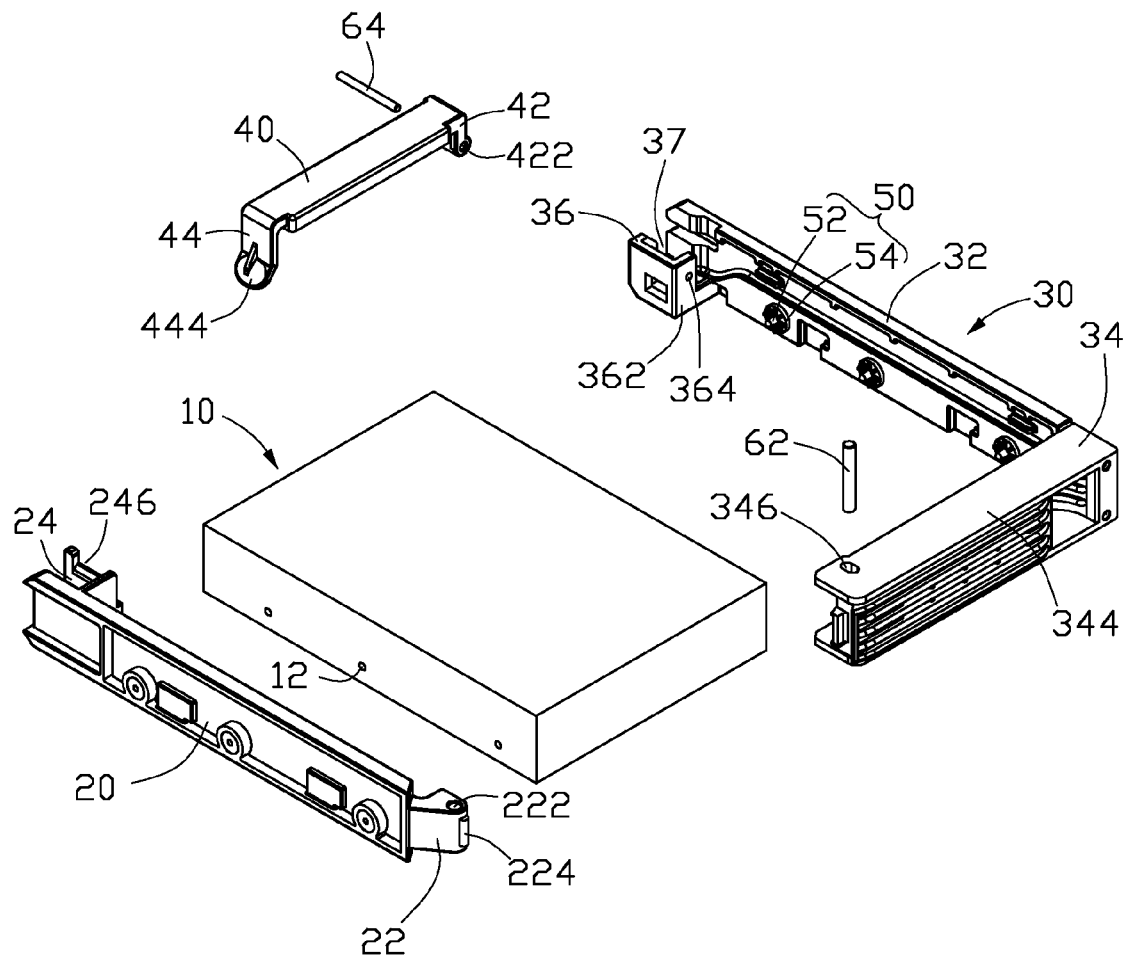

Referring to FIGS. 1 and 2, a fixing apparatus in accordance with an embodiment of the present invention is for fixing a hard disk drive (HDD) 10 and includes a first fixing plate 20, a bracket 30, a transverse bar 40, and two shafts 62, 64.

The HDD 10 includes a pair of holes 12 defined in each of two opposite sidewalls thereof.

The first fixing plate 20 includes a pivoting portion 22 extending slantingly and inward from one end thereof, and a locking portion 24 formed at an inside of the other end thereof. The pivoting portion 22 includes a pivoting hole 222 defined in a free end thereof, and a semi-cylindrical protrusion 224 formed at the outside surface of the free end. The locking portion 24 includes a first wall 242 perpendicular to the first fixing plate 20, and a second wall 243 parallel to the first fixing plate 20 and perpendicularly connecting to the first wall 242. The locking portion 24 and the first fixing plate 20 cooperatively define a receiving space 25. The second wall 243 includes a slot 244 defined in a middle portion thereof, and a cutout 246 defined in an upper portion thereof. A plurality of fixing members 50 is formed at the inside of the first fixing plate 20.

The bracket 30 includes a second fixing plate 32, and a bezel assembly 34 perpendicularly formed at one end of the second fixing plate 32. The second fixing plate 32 includes a pivoting portion 36 formed at an inside of the other end of the second fixing plate 32. The pivoting portion 36 and the second fixing plate 32 cooperatively define a receiving space 37. The pivoting portion 36 includes a pair of spaced walls 362 each perpendicular to the second fixing plate 32. A pair of pivoting holes 364 is defined in the walls 362, respectively. The bezel assembly 34 includes a vertical board 342, and a pair of spaced horizontal boards 344 perpendicular to the vertical board 342. A pair of pivoting holes 346 is defined in outside end portions of the horizontal boards 344, respectively. A resilient tab 343 extends from an inside surface of the vertical board 342. A plurality of fixing members 50 is formed at the inside of the second fixing plate 32.

The transverse bar 40 includes a first depending portion 42 depending from one end thereof, and a second depending portion 44 depending from the other end thereof. The first depending portion 42 includes a pivoting hole 422 defined in an enlarged end portion thereof. The second depending portion 44 includes a wedged block 442 formed at an inside surface thereof, and a handle 444 slantingly extending from a distal end thereof.

Each of the fixing members 50 includes a cap 52, and a pin 54 with one end embedded in the cap 54. The pin 54 is made of metal materials. The cap 52 is made of shock absorbing materials, such as rubber.

Figure 3:
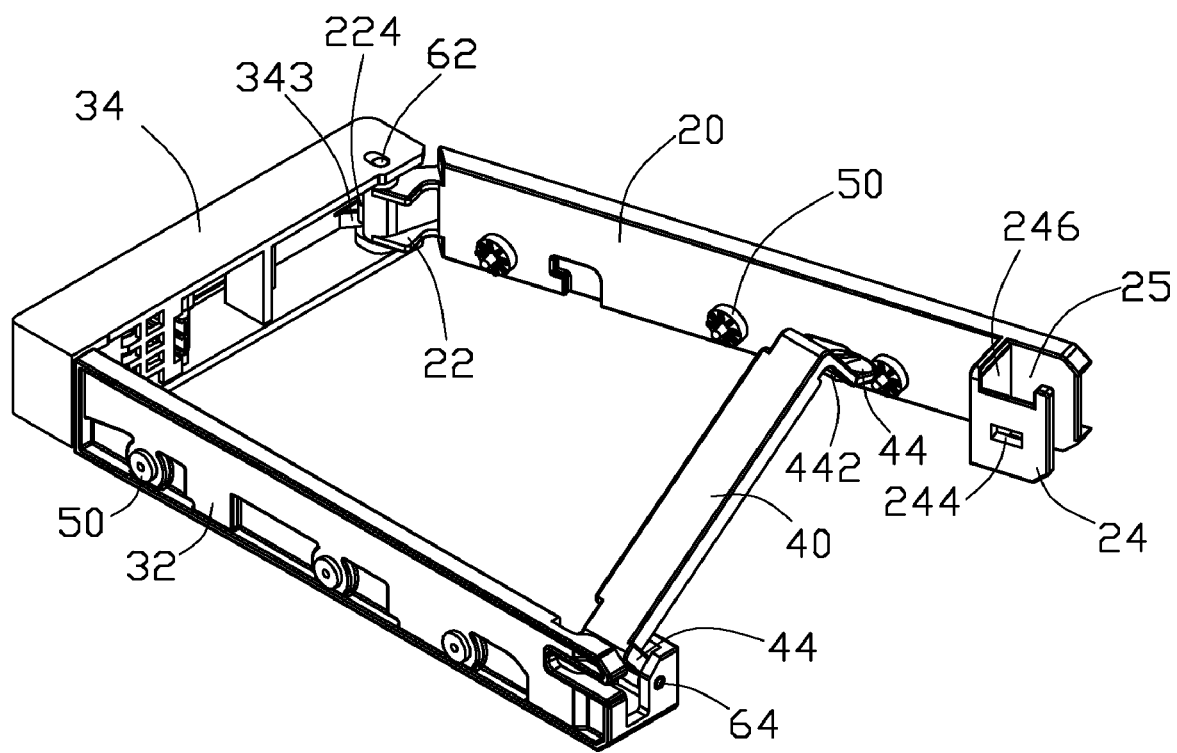
FIG. 3 is an assembled view of the fixing apparatus of FIG. 1 without the HDD.
Figure 4:
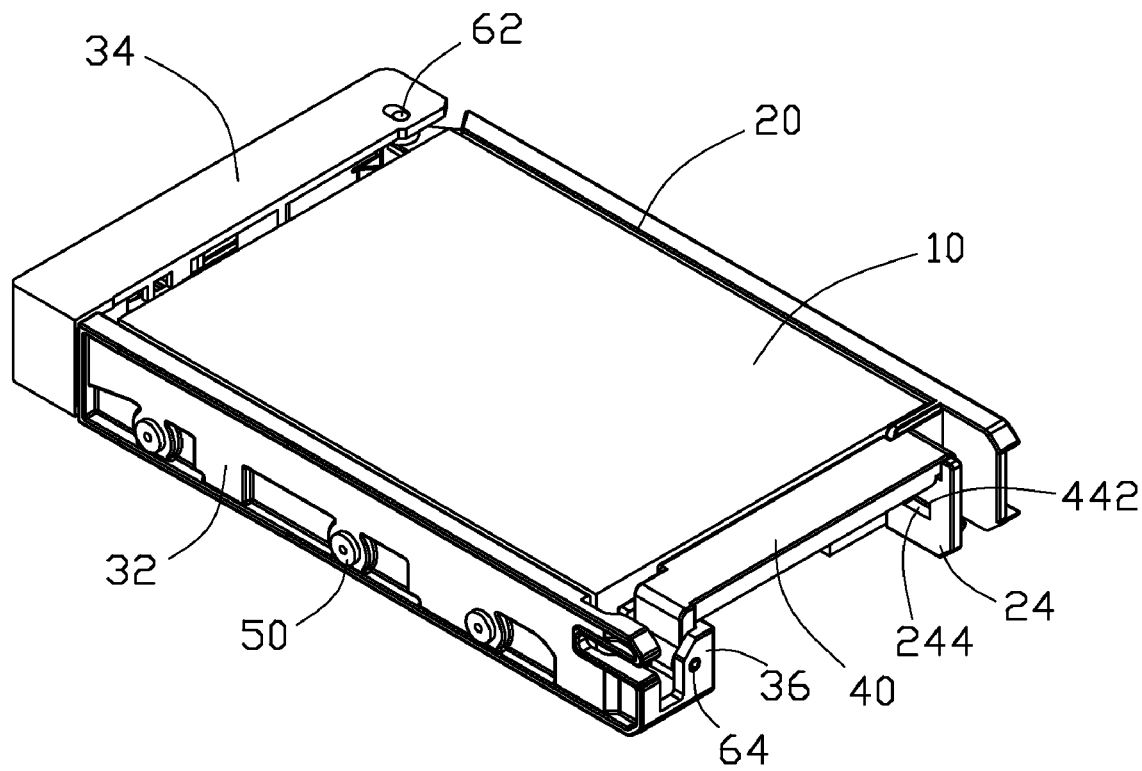
FIG. 4 is an assembled view of the fixing apparatus of FIG. 1 with the HDD.

Referring to FIG. 3, in assembly, the first fixing plate 20 is pivotably attached to the bezel assembly 34 of the bracket 30. The pivoting portion 22 of the first fixing plate 20 is sandwiched between the horizontal boards 344 of the bezel assembly 34, with the shaft 62 extending through the pivoting holes 346 of the bracket 30 and the pivoting holes 222 of the first fixing plate 20. The semi-cylindrical protrusion 224 engagably abuts the resilient tab 343 of the bracket 30. The transverse bar 40 is attached to the second fixing plate 32 of the bracket 30, with the first depending portion 42 of the transverse bar 40 received in the receiving space 37 and the shaft 64 extending through the pivot holes 364 of the bezel assembly 34 and the pivoting holes 422 of the transverse bar 40.

In use, the first fixing plate 20 is pivoted about the shaft 62 and away from the second fixing plate 32 of the bracket 30 to allow the HDD 10 to be placed in the bracket 30, with the pins 52 of the fixing members 50 of the second fixing plate 32 of the bracket 30 extending into the holes 12 of one sidewall of the HDD 10. Then, the first fixing plate 20 is pivoted toward the HDD 10 so that the pins 52 of the fixing members 50 of the first fixing plate 20 extend into the holes 12 of the other sidewall of the HDD 10. The transverse bar 40 is pivoted downward about the shaft 64 so that the second depending portion 44 thereof is received in the receiving space 25 of the first fixing plate 20 and the wedged block 442 thereof passes through the cutout 246 and engages in the slot 244 of the second wall 243 of the first fixing plate 20.

To release the HDD 10, the handle 444 of the transverse bar 40 is drawn to disengage the wedged block 442 of the transverse bar 40 from the slot 244 of the first fixing plate 20. Then, the first fixing plate 20 is pivoted away from the HDD 10 to release the pins 52 thereof from the corresponding holes 12 of the HDD 10. The HDD 10 is easily taken away from the bracket 30.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A fixing apparatus for fixing a hard disk drive (HDD) with a plurality of holes defined in sidewalls thereof, the fixing apparatus comprising:
   a first fixing plate; and
   a bracket comprising a second fixing plate, and a bezel assembly perpendicularly disposed at one end of the second fixing plate, the bezel assembly pivotably engaging with the first fixing plate;
   a transverse bar comprising a first end pivotally attached to the other end of the second fixing plate, and a second end detachably locking with the first fixing plated; and
   a plurality of fixing members disposed in insides of the first fixing plate and the second fixing plate to engage in the holes of HDD.

2. The fixing apparatus as claimed in claim 1, wherein the first fixing plate comprises a pivoting portion extending slantingly from one end thereof, a pivoting hole is defined in the pivoting portion, the bezel assembly comprises a pair of horizontal boards each defining a pivoting hole, the pivoting portion is sandwiched between the horizontal boards, a shaft extends through the pivoting holes of the bezel assembly and the pivoting portion.

3. The fixing apparatus as claimed in claim 2, wherein the pivoting portion of the first fixing plate further comprises a semi-cylindrical protrusion formed at a distal end thereof, the bezel assembly comprises a vertical board perpendicularly disposed between the horizontal boards, the vertical board comprises a resilient tab extending therefrom to engage with the semi-cylindrical protrusion.

4. The fixing apparatus as claimed in claim 2, wherein the second end of the transverse bar comprises a second depending portion depending therefrom, the second depending portion comprises a wedged block formed at an inside thereof, the first fixing plate comprises a locking portion formed at an inside of the other end thereof, the locking portion defines a receiving space to receive the second depending portion and comprises a cutout to engage with the wedged block.

5. The fixing apparatus as claimed in claim 4, wherein the second depending portion of the transverse bar further comprises a handle slantingly extending therefrom.

6. The fixing apparatus as claimed in claim 1, wherein the first end of the transverse bar comprises a first depending portion depending therefrom, a pivoting hole is defined in an enlarged end of the first depending portion, the second fixing plate of the bracket comprises a pivoting portion formed at an inside thereof, the pivoting portion comprises a pair of parallel walls perpendicular to the second fixing plate and each with a pivoting hole, a shaft extends through the pivoting holes of the transverse bar and the pivoting portion of the second fixing plate.

7. The fixing apparatus as claimed in claim 1, wherein each of the fixing members comprises a cap inserted into the first fixing plates or the second fixing plate, and a pin with one end embedded in the cap.

8. The fixing apparatus as claimed in claim 7, wherein the cap is made of shock absorbing materials.

9. A fixing apparatus for fixing a hard disk drive (HDD) with a plurality of holes defined in sidewalls thereof, the fixing apparatus comprising:
   a first fixing plate;
   a bracket comprising a second fixing plate, and a bezel assembly perpendicular to the second fixing plate, two pivoting portions formed at distal ends of the second fixing plate and the bezel assembly respectively, the bezel assembly pivotably engaging with the first fixing plate, the pivoting portion of the bezel assembly pivotably engaging with the first fixing plate;
   a transverse bar pivotally engaging with the pivoting portion of the second fixing plate and detachably locked with the first fixing plate the first fixing plate; and
   a plurality of fixing members formed at insides of the first fixing plate and the second fixing plate to engage in the holes of HDD.

10. The fixing apparatus as claimed in claim 9, wherein the transverse bar comprises a pair of depending portions respectively depending from two opposite ends thereof, the first fixing plate comprises a locking portion defining a space to receive one of the depending portion, the pivoting portion of the second fixing plate comprises a space to receive the other depending portion of the transverse bar.

11. The fixing apparatus as claimed in claim 10, wherein the locking portion of the first fixing plate comprises a wall with a cutout defined therein, the corresponding depending portion of the transverse bar comprises a wedged block engaging in the cutout.

12. The fixing apparatus as claimed in claim 9, wherein each of the fixing members comprises a cap inserted into the first fixing plates or the second fixing plate, and a pin with one end embedded in the cap, the cap is made of shock absorbing materials.

* * * * *